(12) United States Patent
Gallant

(10) Patent No.: US 12,107,747 B1
(45) Date of Patent: Oct. 1, 2024

(54) CHARGEABLE BUTTON LATENCY CHECK

(71) Applicant: GM Cruise Holdings LLC, San Francisco, CA (US)

(72) Inventor: Joel David Gallant, Calgary (CA)

(73) Assignee: GM Cruise Holdings LLC, San Francisco, CA (US)

( * ) Notice: Subject to any disclaimer, the term of this patent is extended or adjusted under 35 U.S.C. 154(b) by 0 days.

(21) Appl. No.: 18/360,708

(22) Filed: Jul. 27, 2023

(51) Int. Cl.
*H04W 4/02* (2018.01)
*H04L 43/0852* (2022.01)
*H04L 67/125* (2022.01)
*H04W 4/00* (2018.01)

(52) U.S. Cl.
CPC ........ *H04L 43/0852* (2013.01); *H04L 67/125* (2013.01)

(58) Field of Classification Search
CPC .. H04L 43/0852; H04L 67/125; H04W 11/18; H04W 4/02; H04W 4/00
USPC ....................................................... 709/224
See application file for complete search history.

(56) References Cited

U.S. PATENT DOCUMENTS

| | | | | |
|---|---|---|---|---|
| 2017/0181703 A1* | 6/2017 | Kaib | .................... | A61N 1/3943 |
| 2018/0111492 A1* | 4/2018 | McCool | ................ | B60L 53/12 |
| 2018/0366961 A1* | 12/2018 | Lammers | ............. | H02J 7/0042 |

* cited by examiner

*Primary Examiner* — Jude Jean Gilles

(57) ABSTRACT

Aspects of the disclosed technology provide solutions for displaying chargeable buttons on a RA system user interface and performing a latency check. A process of the disclosed technology can include steps for displaying a user interface (UI) on a remote assistance system, wherein the UI comprises at least one chargeable button, detecting a user engagement with the at least one chargeable button, wherein the user engagement is configured to communicate one or more commands to an autonomous vehicle (AV) that is communicatively coupled to the RA system, performing a latency check to determine a latency between the AV and the RA system, and aborting the one or more actions on the AV, if a determination is made that the latency exceeds a predetermined threshold. Systems and machine-readable media are also provided.

20 Claims, 6 Drawing Sheets

400

Display A User Interface (UI) On A Remote Advisor (RA) System, Wherein The UI Comprises At Least One Chargeable Button
(402)

Detect A User Engagement With The At Least One Chargeable Button, Wherein The User Engagement Is Configured To Communicate One Or More Commands To An Autonomous Vehicle (AV) That Is Communicatively Coupled To The RA System, Wherein The One Or More Commands Are Configured To Initiate One Or More Actions On The AV
(404)

Perform A Latency Check To Determine A Latency Between The AV And The RA System
(406)

If A Determination Is Made That The Latency Exceeds A Predetermined Threshold, Abort The One Or More Actions On The AV
(408)

FIG. 4

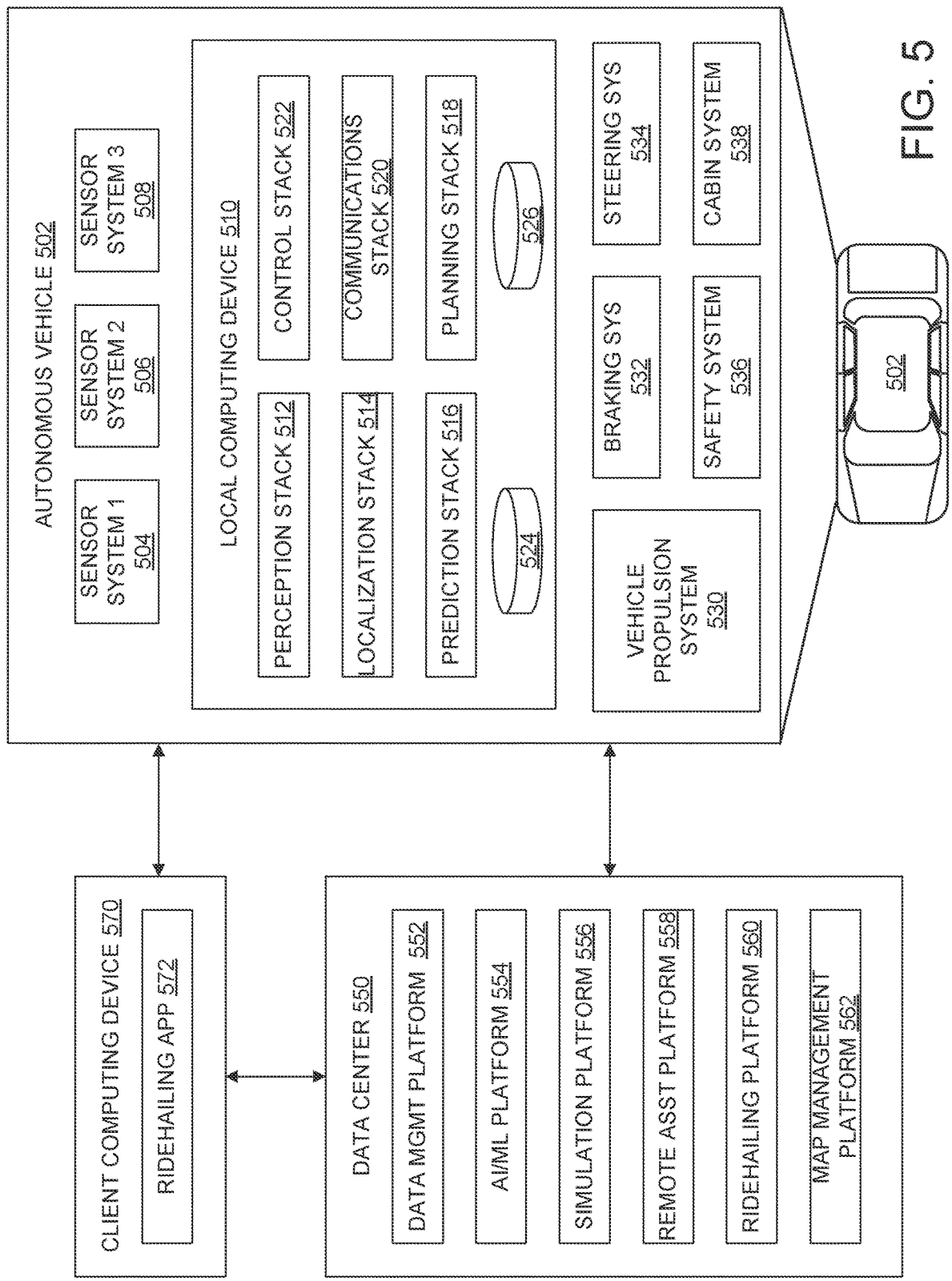

CHARGEABLE BUTTON LATENCY CHECK

BACKGROUND

1. Technical Field

The present disclosure generally relates to solutions for confirming an action of a remote assistance (RA) operator servicing an autonomous vehicle (AV) and in particular, for displaying chargeable buttons on a RA system user interface and performing a latency check to verify the permissibility of actions associated with one or more of the chargeable buttons.

2. Introduction

Autonomous vehicles (AVs) are vehicles having computers and control systems that perform driving and navigation tasks that are conventionally performed by a human driver. As AV technologies continue to advance, they will be increasingly used to improve transportation efficiency and safety. As such, AVs will need to perform many of the functions conventionally performed by human drivers, such as performing navigation and routing tasks necessary to provide safe and efficient transportation. Such tasks may require the collection and processing of large quantities of data using various sensor types, including but not limited to cameras, Light Detection and Ranging (LiDAR) sensors, and/or Radio Detection and Ranging (RADAR) disposed on the AV. In some instances, the collected data can be used by the AV to perform tasks relating to routing, planning, and obstacle avoidance.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 4 illustrates another example of a process for determining a latency between a RA system and an AV, according to some aspects of the disclosed technology.

FIG. 5 illustrates an example system environment that can be used to facilitate autonomous vehicle (AV) dispatch and operations, according to some aspects of the disclosed technology.

DETAILED DESCRIPTION

Figure 1:
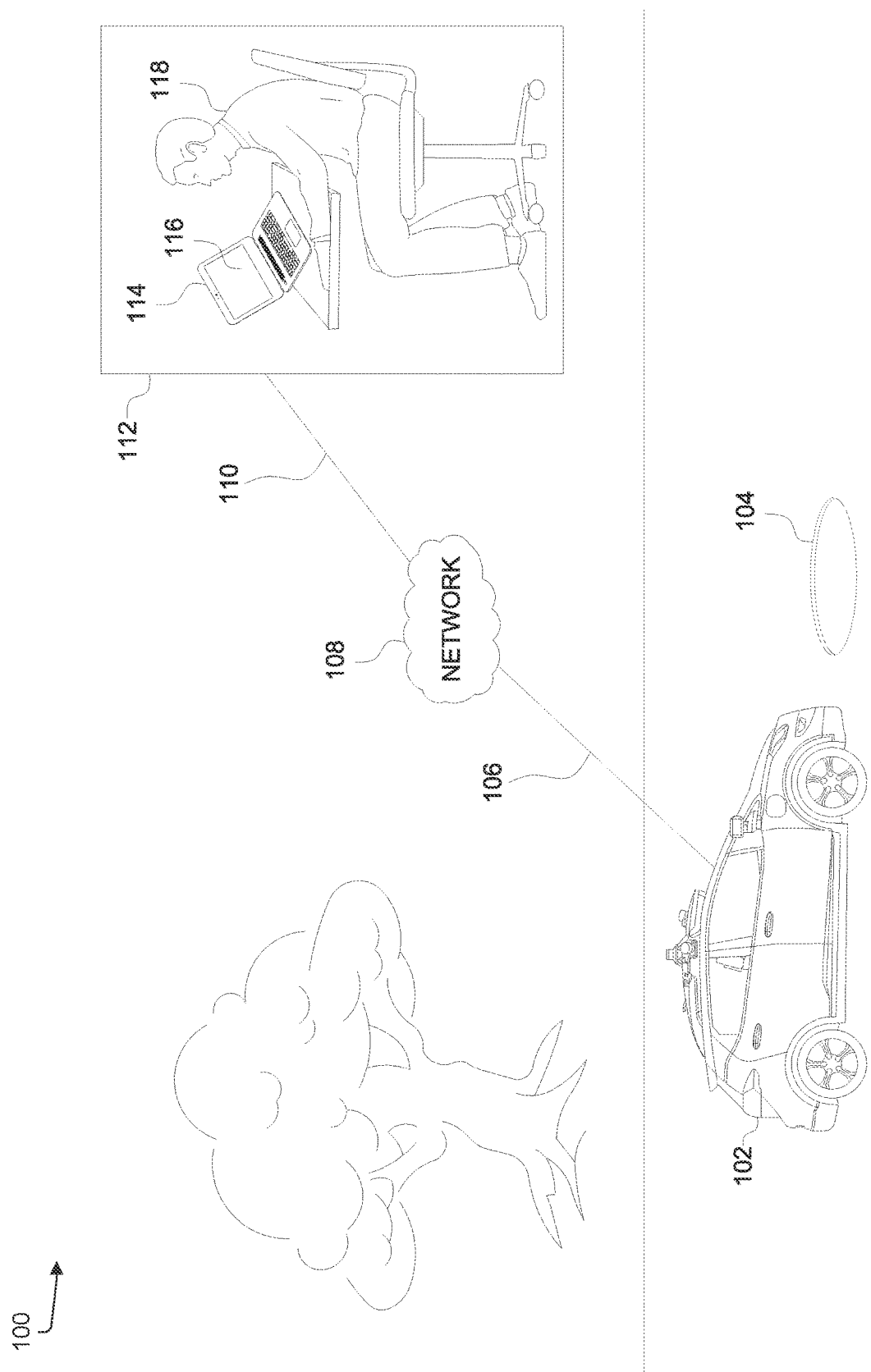
FIG. 1 illustrates an example system environment in which an autonomous vehicle (AV) is communicating with a remote assistance (RA) system via a network, according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Some aspects of the present technology may relate to the gathering and use of data available from various sources to improve safety, quality, and experience. The present disclosure contemplates that in some instances, this gathered data may include personal information. The present disclosure contemplates that the entities involved with such personal information respect and value privacy policies and practices.

Autonomous vehicles are designed to navigate autonomously in an environment without human input or intervention. In some instances, AV navigation systems may malfunction, for example, when the AV encounters novel objects or scenarios that frustrate perception, prediction, and/or planning operations. In these situations, the AV can be configured to request assistance from a Remote Assistance (RA) operator that can provide support necessary to resolve the malfunction. By way of example, an AV may encounter a novel driving scenario, such as a construction road closure or a pothole, through which a path plan cannot be determined by the AV's planning layer. In such instances, the AV's navigation may be aided by instructions received from a remote operator, for example, that can provide commands and/or instructions to the AV, indicating maneuvers and/or paths to navigate through (or around) the road closure. The RA operator may utilize a user interface displayed on a remote assistance (RA) system (e.g., a computer) to communicate commands to the AV, via a computer network, from a remote location.

In some implementations, chargeable buttons, which can be used to register continued user engagement and intent to perform an associated action, can be used to ensure that RA actions communicated to the RV are intentional. However, in some instances, latency between the RA system and the AV can cause information available to the RA operator to be out of date, or irrelevant. By way of example, an RA operator may remotely initiate a maneuver on an AV (e.g., to navigate around a double-parked vehicle). However, newly observed obstructions to the desired AV path, such as the sudden presence of a pedestrian, may not be immediately viewable to the operator, e.g., due to communication latency between the AV and/or the RA systems. In such instances, although the operator may indicate an intent to perform the maneuver, through continuous interaction with the chargeable button, changing circumstances in an environment of the AV may render the maneuver dangerous or impossible.

Aspects of the disclosed technology provide solutions for improving safety by accounting for communication latency (e.g., between the RA operator and the AV) before initiating AV commands via a chargeable button. As used herein, chargeable buttons may include, but are not limited to, any user selectable option that requires continuous user attention and/or engagement to initiate an associated instruction or command. By way of example, a continuous button may be a physical button (such as one or more keyboard keys) or a user interface button or option that requires continuous depression or other engagement for some set amount of time before an associated instruction (such as an AV maneuver) is initiated. Chargeable buttons may include, but are not limited to: displayable icons, progress bars, and buttons on a user interface (e.g., graphical user interface, or GUI) that require a predetermined time period of interaction from the user to confirm the action as indicated by the chargeable button. For example, a chargeable button may require the user (e.g., RA operator) to hold down a mouse click for a predetermined amount of time to confirm an action for the AV. In some cases, the chargeable button may include the display of a progress bar indicating a duration of user engagement, such as an amount of time the user has been holding down a mouse click in general or on a particular area of the interface (e.g., over the button). After the user has engaged (e.g., held down the mouse click) with the chargeable button for the predetermined amount of time as indicated by the progress bar, the user action can be confirmed and transmitted to the AV.

To ensure that RA operator's intended actions reflect recent changes to an environment around the AV, the RA system can perform a latency check to determine if a latency in communicating data from the AV and the RA system would make the requested action potentially unsafe. Communication latency between the AV and the RA system may result from multiple causes and/or latency from multiple different systems and/or communication links.

As used herein, network latency can refer to communication delays that are attributable to packet latency, e.g., a time required to send data packets between the AV and the RA system. As discussed in further detail below, network latency may be measured as a round-trip time (RTT) for packets communicated from the AV to the RA system, and back.

As used herein, system latency can refer to delays attributable to software and/or hardware components of the RA system, such as delays attributable to loading, rendering and/or displaying received AV information in a GUI (such as a web browser) or other display, provided to an RA operator. In some instances, system latency can include a total latency incurred by the RA system used by, or associated with, the operator.

In operation, network and system latency components may each be considered, either independently or jointly, to determine if an RA action should be terminated. For example, if the network latency and/or system latency exceed a predetermined time threshold (individual or collectively), then the RA system can be configured to automatically cancel an action intended for the AV. In such instances, the RA operator may be required to re-engage the chargeable button to re-initiate the desired action. In some embodiments, both the network latency and system latency may be considered to determine when an action corresponding to an engaged chargeable button should be carried out with separate weights applied to each of network latency and system latency before combination and comparison with the predetermined time threshold.

FIG. 1 illustrates an example system environment 100 in which an autonomous vehicle (e.g., AV 102) is communicating with a remote assistance (RA) system 112 via a network 108, according to some aspects of the disclosed technology. In the example environment 100, while autonomously navigating a real-world environment, AV 102 may encounter a scenario that requires remote assistance from a remote assistance (RA) system 112. For example, AV 102 may be unable to autonomously navigate around pothole 104 and send a request (e.g., via signal 106) for assistance to RA system 112. The RA system 112 may communicate one or more commands to AV 102 via signal 110 to initiate one or more actions on AV 102.

In some aspects, RA system 112 and AV 102 may establish a network connection (e.g., via network 108) to facilitate data exchange and communication. The network 108 may include a Wi-Fi network, a vehicle-to vehicle (V2V) network, a cellular network, a satellite network, or a combination thereof. Those skilled in the art will appreciate additional examples of network 108.

In some implementations, RA system 112 may include one or more remote assistance (RA) operators 118 utilizing a computer (e.g., desktop, laptop, tablet computer, mobile device) 114 to communicate one or more commands (e.g., via signal 110) to AV 102. The computer 114 may include a user interface (UI) or graphical user interface (GUI) 116 that enables RA operator 118 to communicate one or more commands to AV 102.

In some cases, UI 116 may display elements including, but not limited to, windows, menus, buttons, sliders, radio buttons, dropdown menus, progress bars, and icons that enable RA operator 108 to communicate commands to AV 102. For example, RA operator 108 may engage (e.g., via a mouse click, keyboard key press, or touch on a touchscreen) with a button on UI 116 to communicate (e.g., via network 108 and signal 110) commands to AV 102 for route guidance such as an alternative path that enables or initiates one or more actions for AV 102 to navigate around pothole 104.

The display elements on UI 116 may also include at least one chargeable button. As described herein, a chargeable button may require the user (e.g., RA operator 118) to engage with the chargeable button for a predetermined time period to confirm the command as indicated by the chargeable button (e.g., the command may be displayed on the chargeable button or in another region within the vicinity of the chargeable button such as a text field or text box). For example, RA operator 118 may click and hold a mouse for a predetermined time period to confirm the command. In another example, RA operator may hold down a keyboard key for a predetermined time period, or touch a touchscreen (e.g., computer 114 includes a touch screen) for a set amount of time to confirm a selection or a command. In the example above, after RA operator 118 has held a chargeable button (e.g., via a mouse click, keyboard key press, touch) for a predetermined time period, RA system 112 may issue commands to AV 102 that cause AV 102 to perform one or more actions. In some embodiments, in addition to one or more of the above, the RA system 112 may detect the focus of the RA operator 118 to the interface, the chargeable button, a sensor feed (e.g., camera feed), or other interface element via data from one or more RA system 112 cameras for a predetermined time period before the RA system 112 issues commands to AV 102 that cause AV 102 to perform one or more actions.

In some implementations, RA system 112 may perform a latency check to determine a latency between RA system 112 and AV 102. For example, latency may include network latency and system latency. The network latency can include the delay, or time taken for data (e.g., signals 106, 110) to travel between RA system 112 and AV 102 over network 108. The system latency may include the delay within the systems of both RA system 112 and AV 102. For example, system latency may include the time taken for data processing, decision making, and response generation within RA system 112 and AV 102. In some cases, system latency may be broken down into additional latency components including, but not limited to, rendering latency (e.g., latency in display visual data) and browser latency (e.g., latency in displaying content within a web browser). Those skilled in the art will appreciate additional examples of latency between AV 102 and RA system 112.

By way of example, the latency may be the combination of the network latency and system latency (e.g., system latency may be the sum of its latency components). In another example, the latency may be determined based on the maximum value of either the system latency or the network latency.

The RA system 112 may determine (e.g., via a latency check) if the latency between RA system 112 and AV 102 exceeds a predetermined threshold. For example, the predetermined threshold may be set by RA system 112. In some examples, if a determination is made that the latency between RA system 112 and AV 102 exceeds a predetermined threshold, RA system 112 may abort the actions (e.g., based on commands inputted by RA operator 118 on UI 116) on AV 102. Alternatively, if a determination is made that the latency between RA system 112 and AV 102 does not exceed a predetermined threshold, RA system 112 may issue commands that initiate actions on AV 102. In some implementations, RA operator 118 may engage with a chargeable button equal to or greater than a predetermined amount of time in order for RA system 112 to issue commands to AV 102.

In some embodiments, commands are associated with separate thresholds. For example, a first set of commands may be associated with a first threshold and a second set of commands may be associated with a second threshold, which is larger than the first threshold (e.g., the second threshold is a higher latency than the first threshold). In this example, although a detected latency may not meet the first threshold, the detected latency may meet the second threshold. Accordingly, the RA system 112 may issue the second set of commands to the AV 102 but not the first set of commands. In some embodiments, the predetermined threshold(s) are relative to the current environment of the AV 102 (e.g., location, weather, busyness, operating state of the AV 102, etc.). For example, in a controlled parking facility, greater latency may be acceptable whereas on a crowded street that higher latency would not be acceptable.

Figure 2:
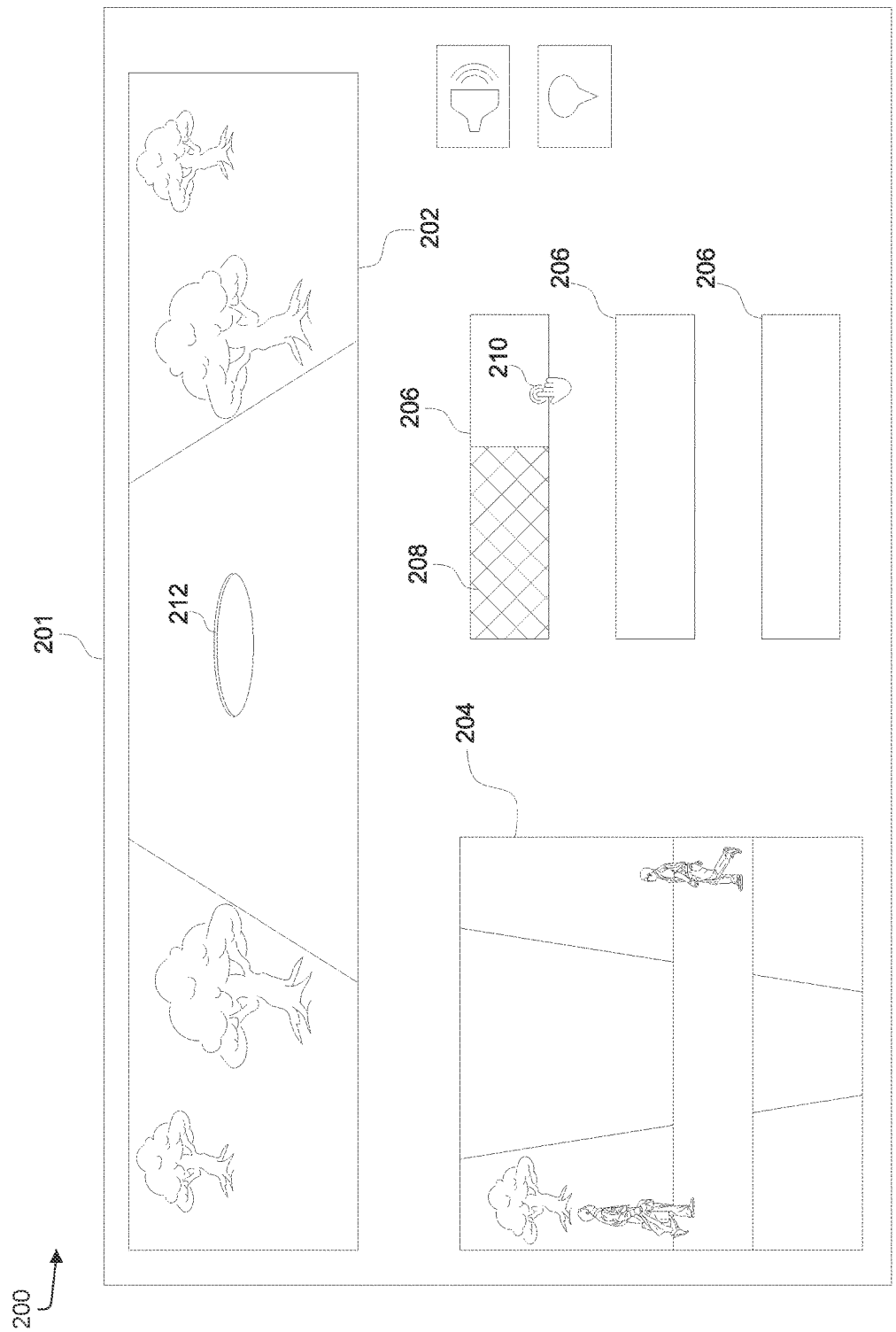
FIG. 2 illustrates an example system environment of a user interface (UI) on a RA system comprising at least one chargeable button, according to some aspects of the disclosed technology.

FIG. 2 illustrates an example system environment 200 of a user interface (UI) 201 on a RA system comprising at least one chargeable button 206, according to some aspects of the disclosed technology. In the example environment 200, UI 201 can be the user interface 116 as illustrated in FIG. 1 displayed on computer 114. For example, RA operator 118 is engaging and interacting with UI 201 to communicate commands to AV 102.

By way of example, UI 201 includes a front view 202 which may represent the view from the perspective of AV 102 in FIG. 1 (e.g., front view 202 is from the perspective through the front windshield of AV 102). As discussed above with respect to FIG. 1, pothole 212 (e.g., pothole 104) may present a scenario that requires remote assistance from RA system 112 in order for AV 102 to navigate around pothole 212. In some implementations, UI 201 may also include a rear view 204 perspective of AV 102.

The RA operator may engage with chargeable button 206, such as using a mouse pointer 210 and/or another input device, such as a touchscreen, a keyboard key, or any other suitable computer input or peripheral device. For example, the RA operator may click and hold (e.g., with a mouse button) chargeable button 206 for a predetermined time period in order to execute a command associated with chargeable button 206. By way of example, chargeable button 206 may include a region 208 indicating the amount of time a user (e.g., RA operator) has engaged (e.g., via a mouse click and hold, keyboard key press and hold, touch and hold on a touchscreen) with chargeable button 206. For example, region 208 may include a different color, shading, or any other visual indication representing the amount of time RA operator has engaged with chargeable button 206. In some instances, the visual indicator may display and/or indicate an amount of time remaining before the associated action or command is issued or executed. After RA operator has engaged with chargeable button 206 for a predetermined amount of time, region 208 can fill up the area of chargeable button 206 (e.g., the white region of chargeable button 206 is filled with the shading as represented by region 208) and communicate the command to the AV (e.g., which may initiate actions for AV 102). In some cases, a user may cancel engagement with chargeable button 206 by moving the mouse pointer outside the area of chargeable button 206, releasing a hold of mouse pointer 210, or initiating a separate cancelation input, such as by pressing an escape key or another button configured to cancel engagement with chargeable button 206.

Figure 3:
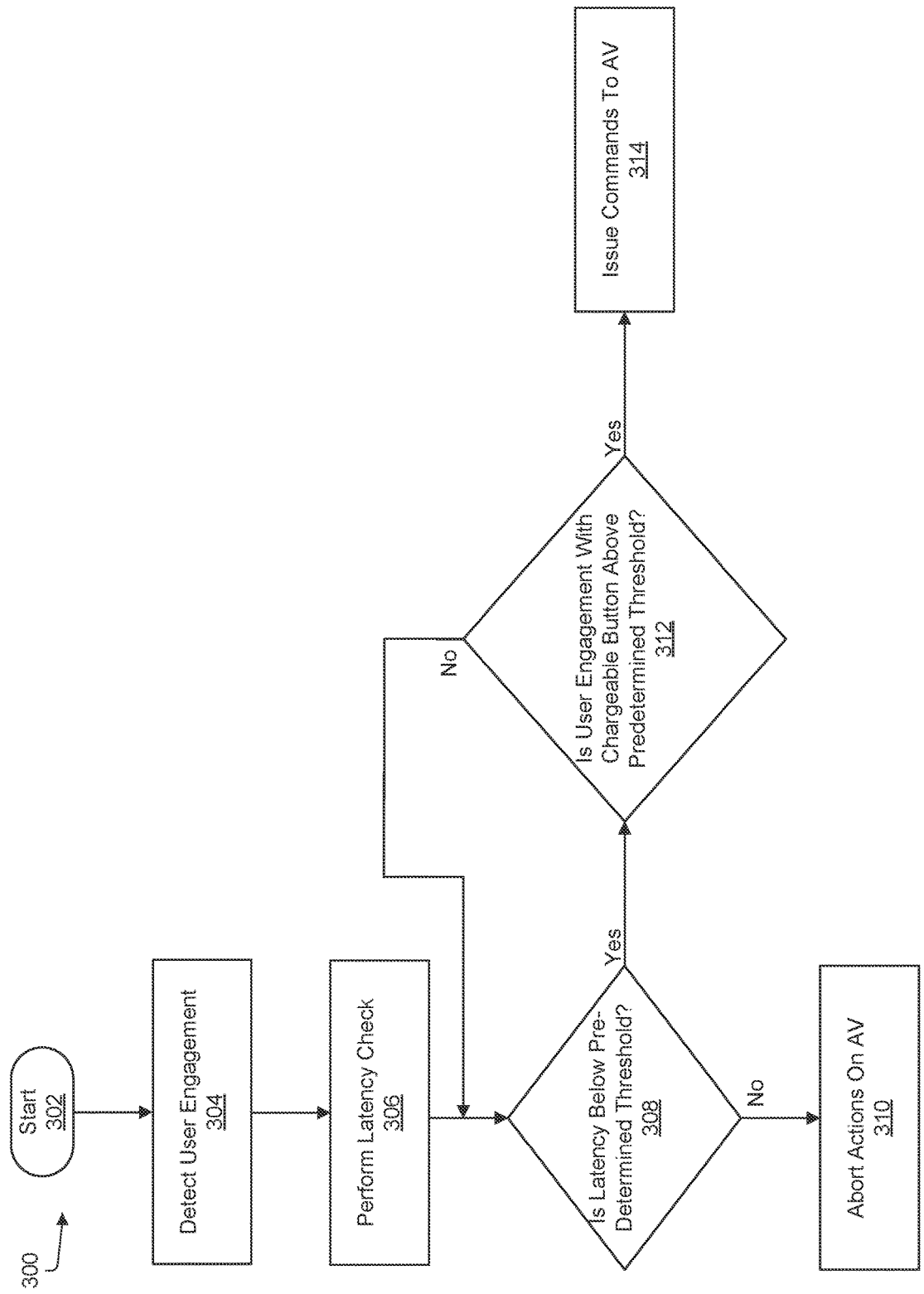
FIG. 3 illustrates an example of a process for determining a latency between a RA system and an AV, according to some aspects of the disclosed technology.

FIG. 3 illustrates an example of a process 300 for determining a latency between a RA system and an AV, according to some aspects of the disclosed technology. In some examples, process 300 may start at step 302 on an RA system (e.g., RA system 112) with RA operator (e.g., RA operator 118) interfacing with a computer (e.g., computer 114). The RA system 112 can include one or more computing systems (or compute nodes/clusters) that are communicatively and securely connected to one or more AVs and which facilitate the communication of RA operator commands to the AV, for example, to cause the AV to alter operations, such as vehicle location, pose, or navigation path, etc.

At step 304, an RA system may detect a user engagement. For example, the RA operator may interface with a UI (e.g., UI 116, UI 201) displayed on the computer. The RA operator may input, using the UI, commands to the AV (e.g., AV 102) that are configured to initiate actions on the AV. By way of example, the RA operator may provide navigation or routing commands to cause the AV to change its location, pose, and/or heading etc., e.g., to maneuver around or past an obstacle or other difficult navigation scenario.

At step 306, the RA system may perform a latency check between the AV and the RA system. For example, the RA system can determine a network latency and system latency between the AV and RA system. In some implementations, the latency check may combine the system latency and network latency to determine an overall latency value. For example, the system latency and network latency durations can be summed to determine the overall (or aggregate) latency, which can represent the amount of total time delay for communications between the RA system and the AV. In another example, the latency check may be performed such that system and network latency are independently evaluated. Although described in relation to latency, other factors may be considered that may affect data from reaching the destination in an expedient manner, including network jitter and packet loss. Such factors may be accounted for in calculations of overall network latency.

At step 308, process 300 can determine whether or not the latency as determined by step 306 is below a predetermined threshold. For example, in instances where aggregate (or total) latency is evaluated, if it is determined (e.g., by the latency check of step 306) that the total latency is above the predetermined threshold (e.g., 50 ms, 100 ms, or 250 ms, etc.) process 300 can continue to step 310. Alternatively, in instances where each latency component is independently evaluated, it can be determined if the network latency exceeds a predetermined threshold (e.g., a network latency threshold), and/or if the system latency exceeds a predetermined threshold (e.g., a system latency threshold). Depending on the desired implementation, exceeding one (or both) thresholds may trigger a cancelation in transmitting RA operator commands to the AV. Additionally, in some aspects, latency thresholds (e.g., either total/aggregate latency threshold, network latency threshold, and/or the system latency threshold) may be dynamically adjustable based on various factors such as a complexity of the environment around the AV, network and/or system conditions. By way of example, aggregate latency thresholds, system latency thresholds, and/or network latency thresholds may be higher if the AV is located in a low complexity environment, e.g., where fewer objects, obstacles, pedestrians, and/or traffic participants are present. In contrast, high-complexity environments (e.g., including those having fast moving or large numbers of dynamic objects or traffic participants) may utilize lower latency thresholds. As such, latency thresholds can be dynamically updated to account, at least in part, for the probability that the AV's environment may materially change during a given time duration, thereby improving safety for highly complex environments, and improving RA operability of AVs in low complexity environments.

At step 310, process 300 may abort sending the one or more actions to the AV. For example, the commands inputted via the UI by the RA operator that are configured to initiate actions on the AV may be aborted. The RA operator may be provided an indication via a corresponding interface of the abort and a reason for the abort (e.g., a latency error and/or a latency value). If it is determined that the latency is below a predetermined threshold (e.g., which may be configured by the RA system), then process 300 can continue to step 312.

At step 312, process 300 can determine if a user engagement with at least one chargeable button is above a predetermined threshold. If a determination is made that the user has engaged with the chargeable button above the predetermined threshold, process 300 continues to step 314. By way of example, RA operator may engage via a mouse click and hold, or a keyboard key press and hold with a chargeable button above a predetermined threshold (e.g., as set by the RA system). At step 314, the RA system may issue the commands corresponding to the chargeable button in step 312 to the AV. If a determination is made that the user has engaged with the chargeable button below the predetermined threshold, process 300 can loop back to step 308 where a determination is made whether or not the latency (e.g., as determined by step 306) is below the pre-determined threshold. Further, although described as detecting latency (or other factors) following detecting user engagement (step 304), the latency check may be conducted before operation 304. For example, step 306 can be an ongoing operation that is performed throughout a remote assistance session with an AV (e.g., as soon as a remote assistance session is commenced with an AV, the RA system continually monitors latency). In another example, as soon as the RA operator begins setting up a situation that would involve engagement of a chargeable button (e.g., setting waypoints on a map, preparing the AV to reverse, etc.), step 306 can be commenced.

In some embodiments, the AV may perform similar latency checks based on the received/issued commands. For example, based on (1) timestamps of the commands and/or corresponding packets and (2) a synchronized clock between the RA system and the AV, the AV may determine the latency of the connection and/or the age of the commands. If the latency and/or age of the commands is beyond an age threshold, the AV may reject the commands an send a corresponding error message to the RA system for presentation to the RA operator.

FIG. 4 illustrates another example of a process 400 for determining a latency between a RA system and an AV, according to some aspects of the disclosed technology. At block 402, process 400 includes displaying a user interface (UI) on a remote assistance (RA) system, wherein the UI comprises at least one chargeable button. The RA system may include a computer displaying a UI or GUI with at least one chargeable button designed for a user (e.g., RA operator) to respond to an autonomous vehicle in a scenario requiring assistance.

At block 404, process 400 includes detecting a user engagement with the at least one chargeable button, wherein the user engagement is configured to communicate one or more commands to an autonomous vehicle (AV) that is communicatively coupled to the RA system, wherein the one or more commands are configured to initiate one or more actions on the AV. The RA system may detect a user engagement, such as an input by an RA operator on a UI communicating commands to an AV that requires assistance. In some implementations, the AV may send a request for assistance to the RA system, or the RA system may initiate assistance without a request from the AV. The RA operator and AV may communicate via a network and the commands received by the AV from the RA system may initiate actions (e.g., remote guidance or control, sensor and data analysis, decision support, software updates) on the AV. Those skilled in the art will appreciate the different types of actions that an RA system may initiate on an AV.

At block 406, process 400 includes performing a latency check to determine a latency between the AV and the RA system. As discussed above, the latency as determined by the latency check can include network latency and/or system latency. In some implementations, the system latency may include various different latency components such as browser latency and rendering latency. In some cases, the latency may be the sum of all the latency components (e.g., network latency and system latency). In another example, the latency may be the maximum of any single latency value (e.g., the maximum of either system latency, network latency, or any latency component).

At block 408, process 400 includes if a determination is made that the latency exceeds a predetermined threshold, aborting the one or more actions on the AV. If a determination is made that the latency is above a predetermined threshold, the RA system can abort the actions on the AV as communicated by the RA operator via the commands as instructed by the UI.

In some cases, if a determination is made that the latency does not exceed a predetermined threshold, process 400 may include issuing the one or more commands to the AV after the user engagement associated with the at least one chargeable button exceeds a predetermined time period. For example, if the RA operator has engaged with the chargeable button above the predetermined time period as configured by the RA system and the latency does not exceed a predetermined threshold, then the RA system may issue (e.g., transmit signal 110 via network 108) the commands to the AV. In some examples, the at least one chargeable button comprises a progress bar, wherein the progress bar indicates a hold time of the user engagement. The chargeable button may include a progress bar (e.g., region 208) that indicates a hold time, or the amount of time the user or RA operator has engaged with the chargeable button. For example, the RA operator may hold a mouse click with the pointer on the chargeable button where the progress bar represents the amount of time the RA operator has held down the mouse click. After the RA operator has exceeded the predetermined time period, the progress bar may fill up the region (or fill up the region allocated for the progress bar within the chargeable button).

FIG. 5 is a diagram illustrating an example autonomous vehicle (AV) environment 500, according to some examples of the present disclosure. One of ordinary skill in the art will understand that, for AV environment 500 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV environment 500 includes an AV 502, a data center 550, and a client computing device 570. The AV 502, the data center 550, and the client computing device 570 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 502 can navigate roadways without a human driver based on sensor signals generated by multiple sensor systems 504, 506, and 508. The sensor systems 504-508 can include one or more types of sensors and can be arranged about the AV 502. For instance, the sensor systems 504-508 can include Inertial Measurement Units (IMUs), cameras (e.g., still image cameras, video cameras, etc.), light sensors (e.g., LiDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 504 can be a camera system, the sensor system 506 can be a LiDAR system, and the sensor system 508 can be a RADAR system. Other examples may include any other number and type of sensors.

The AV 502 can also include several mechanical systems that can be used to maneuver or operate the AV 502. For instance, the mechanical systems can include a vehicle propulsion system 530, a braking system 532, a steering system 534, a safety system 536, and a cabin system 538, among other systems. The vehicle propulsion system 530 can include an electric motor, an internal combustion engine, or both. The braking system 532 can include an engine brake, brake pads, actuators, and/or any other suitable componentry configured to assist in decelerating the AV 502. The steering system 534 can include suitable componentry configured to control the direction of movement of the AV 502 during navigation. The safety system 536 can include lights and signal indicators, a parking brake, airbags, and so forth. The cabin system 538 can include cabin temperature control systems, in-cabin entertainment systems, and so forth. In some examples, the AV 502 might not include human driver actuators (e.g., steering wheel, handbrake, foot brake pedal, foot accelerator pedal, turn signal lever, window wipers, etc.) for controlling the AV 502. Instead, the cabin system 538 can include one or more client interfaces (e.g., Graphical User Interfaces (GUIs), Voice User Interfaces (VUIs), etc.) for controlling certain aspects of the mechanical systems 530-538.

The AV 502 can include a local computing device 510 that is in communication with the sensor systems 504-508, the mechanical systems 530-538, the data center 550, and the client computing device 570, among other systems. The local computing device 510 can include one or more processors and memory, including instructions that can be executed by the one or more processors. The instructions can make up one or more software stacks or components responsible for controlling the AV 502; communicating with the data center 550, the client computing device 570, and other systems; receiving inputs from riders, passengers, and other entities within the AV's environment; logging metrics collected by the sensor systems 504-508; and so forth. In this example, the local computing device 510 includes a perception stack 512, a localization stack 514, a prediction stack 516, a planning stack 518, a communications stack 520, a control stack 522, an AV operational database 524, and an HD geospatial database 526, among other stacks and systems.

Perception stack 512 can enable the AV 502 to "see" (e.g., via cameras, LiDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 504-508, the localization stack 514, the HD geospatial database 526, other components of the AV, and other data sources (e.g., the data center 550, the client computing device 570, third party data sources, etc.). The perception stack 512 can detect and classify objects and determine their current locations, speeds, directions, and the like. In addition, the perception stack 512 can determine the free space around the AV 502 (e.g., to maintain a safe distance from other objects, change lanes, park the AV, etc.). The perception stack 512 can identify environmental uncertainties, such as where to look for moving objects, flag areas that may be obscured or blocked from view, and so forth. In some examples, an output of the perception stack 512 can be a bounding area around a perceived object that can be associated with a semantic label that identifies the type of object that is within the bounding area, the kinematic of the object (information about its movement), a tracked path of the object, and a description of the pose of the object (its orientation or heading, etc.).

Localization stack 514 can determine the AV's position and orientation (pose) using different methods from multiple systems (e.g., GPS, IMUs, cameras, LIDAR, RADAR, ultrasonic sensors, the HD geospatial database 526, etc.). For example, in some cases, the AV 502 can compare sensor data captured in real-time by the sensor systems 504-508 to data in the HD geospatial database 526 to determine its precise (e.g., accurate to the order of a few centimeters or less) position and orientation. The AV 502 can focus its search based on sensor data from one or more first sensor systems (e.g., GPS) by matching sensor data from one or more second sensor systems (e.g., LiDAR). If the mapping and localization information from one system is unavailable, the AV 502 can use mapping and localization information from a redundant system and/or from remote data sources.

Prediction stack 516 can receive information from the localization stack 514 and objects identified by the perception stack 512 and predict a future path for the objects. In some examples, the prediction stack 516 can output several likely paths that an object is predicted to take along with a probability associated with each path. For each predicted path, the prediction stack 516 can also output a range of points along the path corresponding to a predicted location of the object along the path at future time intervals along with an expected error value for each of the points that indicates a probabilistic deviation from that point.

Planning stack 518 can determine how to maneuver or operate the AV 502 safely and efficiently in its environment. For example, the planning stack 518 can receive the location, speed, and direction of the AV 502, geospatial data, data regarding objects sharing the road with the AV 502 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 502 from one point to another and outputs from the perception stack 512, localization stack 514, and prediction stack 516. The planning stack 518 can determine multiple sets of one or more mechanical operations that the AV 502 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road surface conditions and events. If something unexpected happens, the planning stack 518 can select from multiple backup plans to carry out. For example, while preparing to change lanes to turn right at an intersection, another vehicle may aggressively cut into the destination lane, making the lane change unsafe. The planning stack 518 could have already determined an alternative plan for such an event. Upon its occurrence, it could help direct the AV 502 to go around the block instead of blocking a current lane while waiting for an opening to change lanes.

Control stack 522 can manage the operation of the vehicle propulsion system 530, the braking system 532, the steering system 534, the safety system 536, and the cabin system 538. The control stack 522 can receive sensor signals from the sensor systems 504-508 as well as communicate with other stacks or components of the local computing device 510 or a remote system (e.g., the data center 550) to effectuate operation of the AV 502. For example, the control stack 522 can implement the final path or actions from the multiple paths or actions provided by the planning stack 518. This can involve turning the routes and decisions from the planning stack 518 into commands for the actuators that control the AV's steering, throttle, brake, and drive unit.

Communications stack 520 can transmit and receive signals between the various stacks and other components of the AV 502 and between the AV 502, the data center 550, the client computing device 570, and other remote systems. The communications stack 520 can enable the local computing device 510 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). Communications stack 520 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Low Power Wide Area Network (LPWAN), Bluetooth®, infrared, etc.).

The HD geospatial database 526 can store HD maps and related data of the streets upon which the AV 502 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

AV operational database 524 can store raw AV data generated by the sensor systems 504-508, stacks 512-522, and other components of the AV 502 and/or data received by the AV 502 from remote systems (e.g., the data center 550, the client computing device 570, etc.). In some examples, the raw AV data can include HD LIDAR point cloud data, image data, RADAR data, GPS data, and other sensor data that the data center 550 can use for creating or updating AV geospatial data or for creating simulations of situations encountered by AV 502 for future testing or training of various machine learning algorithms that are incorporated in the local computing device 510.

Data center 550 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 550 can include one or more computing devices remote to the local computing device 510 for managing a fleet of AVs and AV-related services. For example, in addition to managing the AV 502, the data center 550 may also support a ride-hailing service (e.g., a ridesharing service), a delivery service, a remote/roadside assistance service, street services (e.g., street mapping, street patrol, street cleaning, street metering, parking reservation, etc.), and the like.

Data center 550 can send and receive various signals to and from the AV 502 and the client computing device 570.

These signals can include sensor data captured by the sensor systems 504-508, roadside assistance requests, software updates, ride-hailing/ridesharing pick-up and drop-off instructions, and so forth. In this example, the data center 550 includes a data management platform 552, an Artificial Intelligence/Machine Learning (AI/ML) platform 554, a simulation platform 556, a remote assistance platform 558, and a ride-hailing platform 560, and a map management platform 562, among other systems.

Data management platform 552 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ride-hailing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 550 can access data stored by the data management platform 552 to provide their respective services.

The AI/ML platform 554 can provide the infrastructure for training and evaluating machine learning algorithms for operating the AV 502, the simulation platform 556, the remote assistance platform 558, the ride-hailing platform 560, the map management platform 562, and other platforms and systems. Using the AI/ML platform 554, data scientists can prepare data sets from the data management platform 552; select, design, and train machine learning models; evaluate, refine, and deploy the models; maintain, monitor, and retrain the models; and so on.

Simulation platform 556 can enable testing and validation of the algorithms, machine learning models, neural networks, and other development efforts for the AV 502, the remote assistance platform 558, the ride-hailing platform 560, the map management platform 562, and other platforms and systems. Simulation platform 556 can replicate a variety of driving environments and/or reproduce real-world scenarios from data captured by the AV 502, including rendering geospatial information and road infrastructure (e.g., streets, lanes, crosswalks, traffic lights, stop signs, etc.) obtained from a cartography platform (e.g., map management platform 562); modeling the behavior of other vehicles, bicycles, pedestrians, and other dynamic elements; simulating inclement weather conditions, different traffic scenarios; and so on.

Remote assistance platform 558 can generate and transmit instructions regarding the operation of the AV 502. For example, in response to an output of the AI/ML platform 554 or other system of the data center 550, the remote assistance platform 558 can prepare instructions for one or more stacks or other components of the AV 502.

Ride-hailing platform 560 can interact with a customer of a ride-hailing service via a ride-hailing application 572 executing on the client computing device 570. The client computing device 570 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ride-hailing application 572. The client computing device 570 can be a customer's mobile computing device or a computing device integrated with the AV 502 (e.g., the local computing device 510). The ride-hailing platform 560 can receive requests to pick up or drop off from the ride-hailing application 572 and dispatch the AV 502 for the trip.

Map management platform 562 can provide a set of tools for the manipulation and management of geographic and spatial (geospatial) and related attribute data. The data management platform 552 can receive LIDAR point cloud data, image data (e.g., still image, video, etc.), RADAR data, GPS data, and other sensor data (e.g., raw data) from one or more AVs 502, Unmanned Aerial Vehicles (UAVs), satellites, third-party mapping services, and other sources of geospatially referenced data. The raw data can be processed, and map management platform 562 can render base representations (e.g., tiles (2D), bounding volumes (3D), etc.) of the AV geospatial data to enable users to view, query, label, edit, and otherwise interact with the data. Map management platform 562 can manage workflows and tasks for operating on the AV geospatial data. Map management platform 562 can control access to the AV geospatial data, including granting or limiting access to the AV geospatial data based on user-based, role-based, group-based, task-based, and other attribute-based access control mechanisms. Map management platform 562 can provide version control for the AV geospatial data, such as to track specific changes that (human or machine) map editors have made to the data and to revert changes when necessary. Map management platform 562 can administer release management of the AV geospatial data, including distributing suitable iterations of the data to different users, computing devices, AVs, and other consumers of HD maps. Map management platform 562 can provide analytics regarding the AV geospatial data and related data, such as to generate insights relating to the throughput and quality of mapping tasks.

In some embodiments, the map viewing services of map management platform 562 can be modularized and deployed as part of one or more of the platforms and systems of the data center 550. For example, the AI/ML platform 554 may incorporate the map viewing services for visualizing the effectiveness of various object detection or object classification models, the simulation platform 556 may incorporate the map viewing services for recreating and visualizing certain driving scenarios, the remote assistance platform 558 may incorporate the map viewing services for replaying traffic incidents to facilitate and coordinate aid, the ride-hailing platform 560 may incorporate the map viewing services into the client application 572 to enable passengers to view the AV 502 in transit en route to a pick-up or drop-off location, and so on.

While the autonomous vehicle 502, the local computing device 510, and the autonomous vehicle environment 500 are shown to include certain systems and components, one of ordinary skill will appreciate that the autonomous vehicle 502, the local computing device 510, and/or the autonomous vehicle environment 500 can include more or fewer systems and/or components than those shown in FIG. 5. For example, the autonomous vehicle 502 can include other services than those shown in FIG. 5 and the local computing device 510 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 5. An illustrative example of a computing device and hardware components that can be implemented with the local computing device 510 is described below with respect to FIG. 6.

Figure 6:
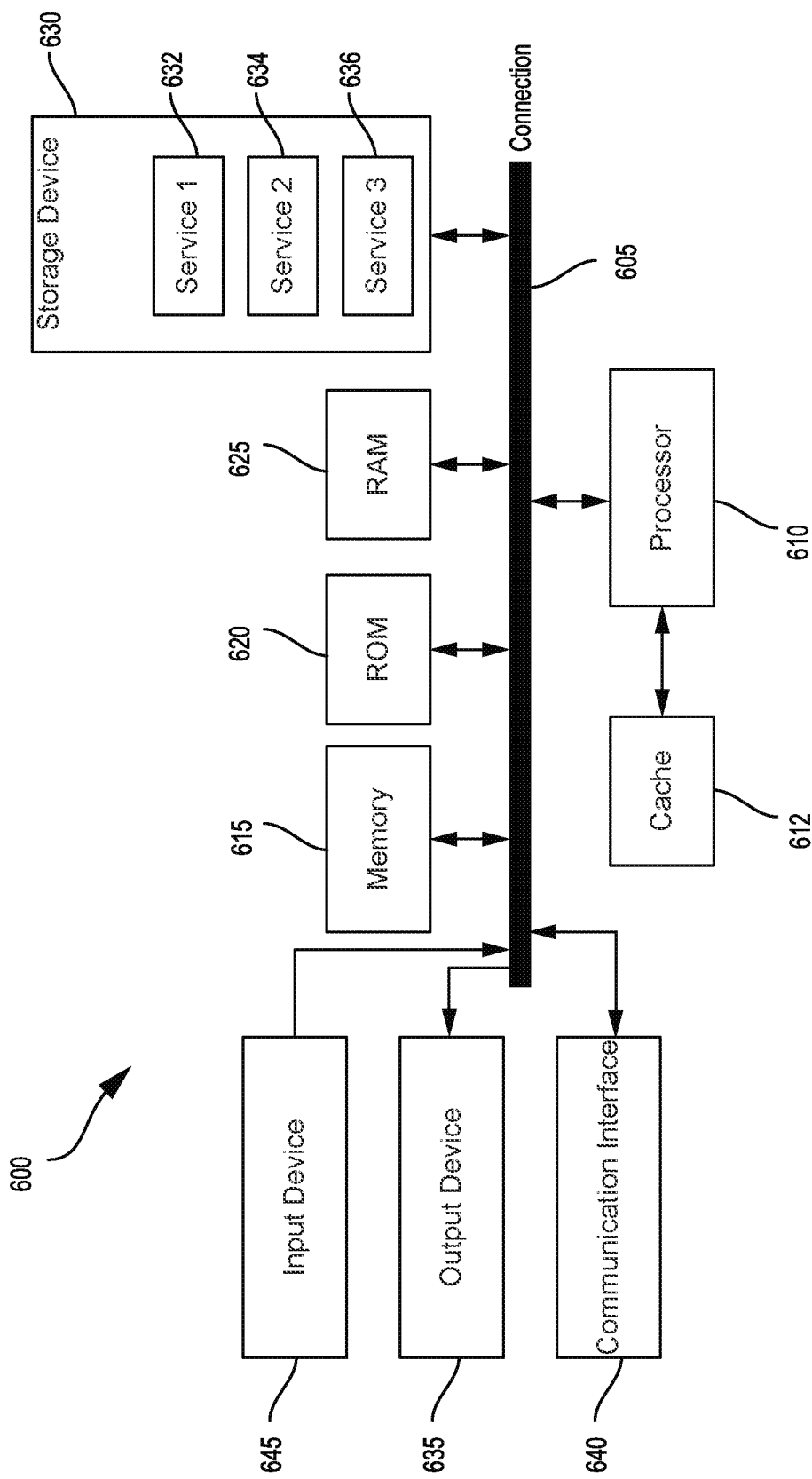
FIG. 6 illustrates an example processor-based system with which some aspects of the subject technology can be implemented.

FIG. 6 illustrates an example processor-based system with which some aspects of the subject technology can be implemented. For example, processor-based system 600 can be any computing device making up, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (Central Processing Unit (CPU) or processor) 610 and connection 605 that couples various system components including system memory 615, such as Read-Only Memory (ROM) 620 and Random-Access Memory (RAM) 625 to processor 610. Computing system 600 can include a cache of high-speed memory 612 connected directly with, in close proximity to, or integrated as part of processor 610.

Processor 610 can include any general-purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 630 can include software services, servers, services, etc., that when the code that defines such software is executed by the processor 610, it causes the system 600 to perform a function. In some embodiments, a hardware service that performs a particular function can include the software component stored in a computer-readable medium in connection with the necessary hardware components, such as processor 610, connection 605, output device 635, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Selected Examples

Illustrative examples of the disclosure include:

Aspect 1. An apparatus comprising: at least one memory; and at least one processor coupled to the at least one memory, the at least one processor configured to: display a user interface (UI) on a remote assistance (RA) system, wherein the UI comprises at least one chargeable button; detect a user engagement with the at least one chargeable button, wherein the user engagement is configured to communicate one or more commands to an autonomous vehicle (AV) that is communicatively coupled to the RA system, wherein the one or more commands are configured to initiate one or more actions on the AV; perform a latency check to determine a latency between the AV and the RA system; and if a determination is made that the latency exceeds a predetermined threshold, abort the one or more actions on the AV.

Aspect 2. The apparatus of Aspect 1, wherein the at least one processor is further configured to: if a determination is made that the latency does not exceed a predetermined threshold, issue the one or more commands to the AV after the user engagement associated with the at least one chargeable button exceeds a predetermined time period.

Aspect 3. The apparatus of any of Aspects 1-2, wherein the latency comprises at least one of a network latency, a system latency, or a combination thereof.

Aspect 4. The apparatus of Aspect 3, wherein the system latency comprises at least one of a browser latency, rendering latency, or a combination thereof.

Aspect 5. The apparatus of any of Aspects 1-4, wherein the RA system and the AV are connected to a network, wherein the network comprises at least one of a cellular network, a Wi-Fi network, a satellite network, a vehicle-to-vehicle (V2V) network, or a combination thereof.

Aspect 6. The apparatus of any of Aspects 1-5, wherein the at least one chargeable button comprises a progress bar, wherein the progress bar indicates a hold time of the user engagement.

Aspect 7. The apparatus of any of Aspects 1-6, wherein the user engagement with the at least one chargeable button comprises at least one of a mouse click and hold, a keyboard key hold, or a combination thereof.

Aspect 8. A computer-implemented method comprising: displaying a user interface (UI) on a remote assistance (RA) system, wherein the UI comprises at least one chargeable button; detecting a user engagement with the at least one chargeable button, wherein the user engagement is configured to communicate one or more commands to an autonomous vehicle (AV) that is communicatively coupled to the RA system, wherein the one or more commands are configured to initiate one or more actions on the AV; performing a latency check to determine a latency between the AV and the RA system; and if a determination is made that the latency exceeds a predetermined threshold, aborting the one or more actions on the AV.

Aspect 9. The computer-implemented method of Aspect 8, further comprising: if a determination is made that the latency does not exceed a predetermined threshold, issuing the one or more commands to the AV after the user engagement associated with the at least one chargeable button exceeds a predetermined time period.

Aspect 10. The computer-implemented method of any of Aspects 8-9, wherein the latency comprises at least one of a network latency, a system latency, or a combination thereof.

Aspect 11. The computer-implemented method of Aspect 10, wherein the system latency comprises at least one of a browser latency, rendering latency, or a combination thereof.

Aspect 12. The computer-implemented method of any of Aspects 8-11, wherein the RA system and the AV are connected to a network, wherein the network comprises at least one of a cellular network, a Wi-Fi network, a satellite network, a vehicle-to-vehicle (V2V) network, or a combination thereof.

Aspect 13. The computer-implemented method of any of Aspects 8-12, wherein the at least one chargeable button comprises a progress bar, wherein the progress bar indicates a hold time of the user engagement.

Aspect 14. The computer-implemented method of any of Aspects 8-13, wherein the user engagement with the at least one chargeable button comprises at least one of a mouse click and hold, a keyboard key hold, or a combination thereof.

Aspect 15. A non-transitory computer-readable storage medium comprising at least one instruction for causing a computer or processor to: display a user interface (UI) on a remote assistance (RA) system, wherein the UI comprises at least one chargeable button; detect a user engagement with the at least one chargeable button, wherein the user engagement is configured to communicate one or more commands to an autonomous vehicle (AV) that is communicatively coupled to the RA system, wherein the one or more commands are configured to initiate one or more actions on the AV; perform a latency check to determine a latency between the AV and the RA system; and if a determination is made that the latency exceeds a predetermined threshold, abort the one or more actions on the AV.

Aspect 16. The non-transitory computer-readable storage medium of Aspect 15, wherein the at least one instruction is further configured to cause the computer or processor to: if a determination is made that the latency does not exceed a predetermined threshold, issue the one or more commands to the AV after the user engagement associated with the at least one chargeable button exceeds a predetermined time period.

Aspect 17. The non-transitory computer-readable storage medium of any of Aspects 15-16, wherein the latency comprises at least one of a network latency, a system latency, or a combination thereof.

Aspect 18. The non-transitory computer-readable storage medium of Aspect 17, wherein the system latency comprises at least one of a browser latency, rendering latency, or a combination thereof.

Aspect 19. The non-transitory computer-readable storage medium of any of Aspects 15-18, wherein the RA system and the AV are connected to a network, wherein the network comprises at least one of a cellular network, a Wi-Fi network, a satellite network, a vehicle-to-vehicle (V2V) network, or a combination thereof.

Aspect 20. The non-transitory computer-readable storage medium of any of Aspects 15-19, wherein the at least one chargeable button comprises a progress bar, wherein the progress bar indicates a hold time of the user engagement.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. An apparatus comprising:
   at least one memory; and
   at least one processor coupled to the at least one memory, the at least one processor configured to:
   display a user interface (UI) on a remote assistance (RA) system, wherein the UI comprises at least one chargeable button;
   detect a user engagement with the at least one chargeable button, wherein the user engagement is configured to communicate one or more commands to an autonomous vehicle (AV) that is communicatively coupled to the RA system, wherein the one or more commands are configured to initiate one or more actions on the AV;
   perform a latency check to determine a latency between the AV and the RA system; and
   abort the one or more actions on the AV, if a determination is made that the latency exceeds a predetermined threshold.

2. The apparatus of claim 1, wherein the at least one processor is further configured to:
   issue the one or more commands to the AV after the user engagement associated with the at least one chargeable button exceeds a predetermined time period, if a determination is made that the latency does not exceed the predetermined threshold.

3. The apparatus of claim 1, wherein the latency comprises at least one of a network latency, a system latency, or a combination thereof.

4. The apparatus of claim 3, wherein the system latency comprises at least one of a browser latency, a rendering latency, or a combination thereof.

5. The apparatus of claim 1, wherein the RA system and the AV are connected to a network, wherein the network comprises at least one of a cellular network, a Wi-Fi network, a satellite network, a vehicle-to-vehicle (V2V) network, or a combination thereof.

6. The apparatus of claim 1, wherein the at least one chargeable button comprises a progress bar, wherein the progress bar indicates a hold time of the user engagement.

7. The apparatus of claim 1, wherein the user engagement with the at least one chargeable button comprises at least one of a mouse click and hold, a keyboard key hold, or a combination thereof.

8. A computer-implemented method comprising:
   displaying a user interface (UI) on a remote assistance (RA) system, wherein the UI comprises at least one chargeable button;
   detecting a user engagement with the at least one chargeable button, wherein the user engagement is configured to communicate one or more commands to an autonomous vehicle (AV) that is communicatively coupled to the RA system, wherein the one or more commands are configured to initiate one or more actions on the AV;
   performing a latency check to determine a latency between the AV and the RA system; and
   aborting the one or more actions on the AV, if a determination is made that the latency exceeds a predetermined threshold.

9. The computer-implemented method of claim 8, further comprising:
   issuing the one or more commands to the AV after the user engagement associated with the at least one chargeable button exceeds a predetermined time period, if a determination is made that the latency does not exceed the predetermined threshold.

10. The computer-implemented method of claim 8, wherein the latency comprises at least one of a network latency, a system latency, or a combination thereof.

11. The computer-implemented method of claim 10, wherein the system latency comprises at least one of a browser latency, a rendering latency, or a combination thereof.

12. The computer-implemented method of claim 8, wherein the RA system and the AV are connected to a network, wherein the network comprises at least one of a cellular network, a Wi-Fi network, a satellite network, a vehicle-to-vehicle (V2V) network, or a combination thereof.

13. The computer-implemented method of claim 8, wherein the at least one chargeable button comprises a progress bar, wherein the progress bar indicates a hold time of the user engagement.

14. The computer-implemented method of claim 8, wherein the user engagement with the at least one chargeable button comprises at least one of a mouse click and hold, a keyboard key hold, or a combination thereof.

15. A non-transitory computer-readable storage medium comprising at least one instruction for causing a computer or processor to:
  display a user interface (UI) on a remote assistance (RA) system, wherein the UI comprises at least one chargeable button;
  detect a user engagement with the at least one chargeable button, wherein the user engagement is configured to communicate one or more commands to an autonomous vehicle (AV) that is communicatively coupled to the RA system, wherein the one or more commands are configured to initiate one or more actions on the AV;
  perform a latency check to determine a latency between the AV and the RA system; and
  abort the one or more actions on the AV, if a determination is made that the latency exceeds a predetermined threshold.

16. The non-transitory computer-readable storage medium of claim 15, wherein the at least one instruction is further configured to cause the computer or processor to:
  issue the one or more commands to the AV after the user engagement associated with the at least one chargeable button exceeds a predetermined time period, if a determination is made that the latency does not exceed the predetermined threshold.

17. The non-transitory computer-readable storage medium of claim 15, wherein the latency comprises at least one of a network latency, a system latency, or a combination thereof.

18. The non-transitory computer-readable storage medium of claim 17, wherein the system latency comprises at least one of a browser latency, a rendering latency, or a combination thereof.

19. The non-transitory computer-readable storage medium of claim 15, wherein the RA system and the AV are connected to a network, wherein the network comprises at least one of a cellular network, a Wi-Fi network, a satellite network, a vehicle-to-vehicle (V2V) network, or a combination thereof.

20. The non-transitory computer-readable storage medium of claim 15, wherein the at least one chargeable button comprises a progress bar, wherein the progress bar indicates a hold time of the user engagement.

* * * * *